No. 665,123. Patented Jan. 1, 1901.
J. McLOUGHLIN.
GAME APPARATUS.
(Application filed Oct. 16, 1900.)
(No Model.)

WITNESSES:
F. H. Wiman
Peter R. Ross

INVENTOR
John McLoughlin
BY
Henry Connett
ATTORNEY

THE NORRIS PETERS CO., PHOTO-LITHO., WASHINGTON, D. C.

UNITED STATES PATENT OFFICE.

JOHN McLOUGHLIN, OF NEW YORK, N. Y.

GAME APPARATUS.

SPECIFICATION forming part of Letters Patent No. 665,123, dated January 1, 1901.

Application filed October 16, 1900. Serial No. 33,199. (No model.)

*To all whom it may concern:*

Be it known that I, JOHN MCLOUGHLIN, a citizen of the United States, residing in the borough of Manhattan, city, county, and State of New York, have invented certain Improvements in Game Apparatus, of which the following is a specification.

This invention relates to apparatuses whereby games may be played; and it consists of a game-board and pieces or men adapted to be moved over the board. The face of the board is divided up into squares or divisions of alternately-contrasting colors, tints, or shades—as red and black, for example—and certain of the squares or divisions at opposite sides of the board are marked with significant distinguishing characters. The pieces or men are in two sets, those of one set differing from those of the other set in color or tint, and these men are marked with distinguishing characters corresponding with those on the squares on the board.

Figure 1:
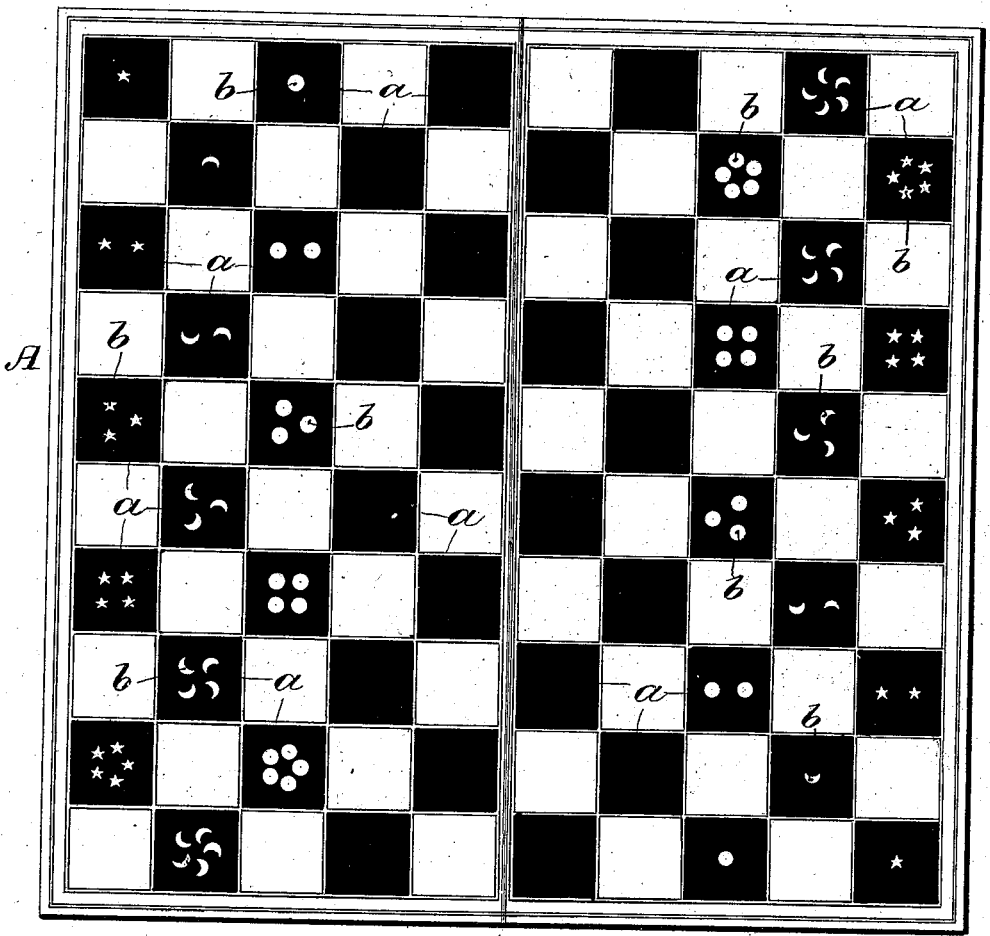
Figure 2:
Figure 2:
Figure 2:
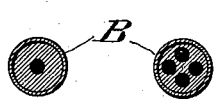
Figure 3:
Figure 3:
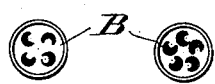
Figure 3:
Figure 4:
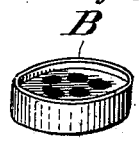

In the accompanying drawings, which illustrate an embodiment of the invention, Figure 1 is a plan view of the board forming a part of the game apparatus. Fig. 2 represents some of the marked pieces or men of one set, and Fig. 3 represents some of the marked men of the other set. Fig. 4 is a perspective view of one of the pieces.

In Fig. 1, A represents the game-board, which may be made to fold bookwise along the line $x$. This board is subdivided on its face into one hundred squares or divisions, which alternate in color or tint in the manner of an ordinary chess-board. They may be red and black, for example; but the colors are not important.

At opposite sides of the board three rows of the squares of one color or tint $a$, here shown as black squares, are marked with significant characters $b$, the mark on each square being different from those on all of the others. The marks chosen herein are the star, the crescent, and the disk, the first row of five squares being marked, respectively, with one, two, three, four, and five stars, the second row with one, two, three, four, and five crescents, and the third row with one, two, three, four, and five disks. Thus the opposite sides of the board have the squares marked in the same manner, the numbering beginning at the left of the player.

The pieces B (seen in Figs. 2, 3, and 4) are marked in the same manner as the squares on the board. There will be fifteen pieces in each set, those of one set contrasting in color or tint with those of the other set. It has not been deemed necessary to show every piece in the set, as they may be all exactly alike except as to coloring and marking, and the markings $b$ on each piece of the set corresponds to a marking in the set of markings on the board—that is to say, of each set of the pieces B five will be marked with stars, from one to five in number, five will be marked with crescents, from one to five in number, and five will be marked with disks, from one to five in number. Each piece belongs to the square bearing the same mark or character.

Obviously the markings need not necessarily be stars, crescents, and disks. They might, for example, be crosses, triangles, and rectangles, respectively, or letters, as "A," "B," and "C." The point is that in the markings of each set of squares on the board and in the markings of each set of pieces there shall be three characters and five markings of each character where the board has fifteen pieces in a set.

Having thus described my invention, I claim—

1. A game apparatus comprising a board having divisions, the alternate divisions in the three adjacent rows at opposite sides of the board being marked with characters, each row having a different distinguishing character, and the divisions of each row being distinguished by the number of the characters marked thereon, and pieces, equal in number to the marked divisions on the board and marked, respectively, with characters corresponding to those on the divisions of the board.

2. A game apparatus comprising a board having its surface divided into rows of squares of alternately-contrasting shades or colors, and having three adjacent rows at the side of the board marked each with a different character, the squares in each row being distinguished by the number of the particular characters marked thereon, and pieces, equal in number to said marked squares and marked, respectively, with characters like those on the squares in kind and number.

3. A game-board having divisions, the three adjacent rows of divisions at opposite sides of the board being marked each row with a different character, and the alternate divisions of each row being distinguished by the numbers of said characters marked thereon, substantially as set forth.

In witness whereof I have hereunto signed my name, this 15th day of October, 1900, in the presence of two subscribing witnesses.

JOHN McLOUGHLIN.

Witnesses:
HENRY CONNETT,
PETER A. ROSS.